United States Patent
Tremblay et al.

(10) Patent No.: US 7,124,331 B2
(45) Date of Patent: Oct. 17, 2006

(54) METHOD AND APPARATUS FOR PROVIDING FAULT-TOLERANCE FOR TEMPORARY RESULTS WITHIN A CPU

(75) Inventors: Marc Tremblay, Menlo Park, CA (US); Shailender Chaudhry, San Francisco, CA (US); Quinn A. Jacobson, Sunnyvale, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 813 days.

(21) Appl. No.: 10/146,102

(22) Filed: May 14, 2002

(65) Prior Publication Data

US 2004/0078728 A1     Apr. 22, 2004

(51) Int. Cl.
    *G06F 11/00* (2006.01)
(52) U.S. Cl. .................................. 714/52
(58) Field of Classification Search ............ 714/52
    See application file for complete search history.

(56) References Cited

U.S. PATENT DOCUMENTS

| | | | |
|---|---|---|---|
| 4,701,915 A * | 10/1987 | Kitamura et al. ............. 714/6 |
| 4,750,177 A * | 6/1988 | Hendrie et al. ............. 714/748 |
| 4,783,783 A | 11/1988 | Nagai et al. ................. 371/12 |
| 5,150,469 A | 9/1992 | Jouppi ........................ 395/375 |
| 5,276,862 A * | 1/1994 | McCulley et al. ............. 714/15 |
| 5,987,588 A * | 11/1999 | Popescu et al. ............... 712/23 |
| 6,163,837 A * | 12/2000 | Chan et al. ................. 712/216 |
| 6,226,338 B1 * | 5/2001 | Earnest ....................... 375/372 |
| 6,247,106 B1 | 6/2001 | Witt ............................ 711/203 |

FOREIGN PATENT DOCUMENTS

WO    WO01/25904 A1    4/2001

* cited by examiner

*Primary Examiner*—Robert Beausoliel
*Assistant Examiner*—Elmira Mehrmanesh
(74) *Attorney, Agent, or Firm*—Park, Vaughan & Fleming, LLP

(57) ABSTRACT

One embodiment of the present invention provides a system that corrects bit errors in temporary results within a central processing unit (CPU). During operation, the system receives a temporary result during execution of an in-flight instruction. Next, the system generates a parity bit for the temporary result, and stores the temporary result and the parity bit in a temporary register within the CPU. Before the temporary result is committed to the architectural state of the CPU, the system checks the temporary result and the parity bit to detect a bit error. If a bit error is detected, the system performs a micro-trap operation to re-execute the instruction that generated the temporary result, thereby regenerating the temporary result. Otherwise, if a bit error is not detected, the system commits the temporary result to the architectural state of the CPU.

15 Claims, 3 Drawing Sheets

METHOD AND APPARATUS FOR PROVIDING FAULT-TOLERANCE FOR TEMPORARY RESULTS WITHIN A CPU

BACKGROUND

1. Field of the Invention

The present invention relates to providing fault-tolerance within computer systems. More specifically, the present invention relates to a method and an apparatus for providing fault-tolerance for temporary results within a central processing unit (CPU) before the temporary results are committed to the architectural state of the CPU.

2. Related Art

Rapid advances in semiconductor technology presently make it possible to incorporate larger amounts of circuitry into a microprocessor chip. Unfortunately, memory elements within this circuitry are susceptible to random bit errors. Hence, as more circuitry is incorporated into a microprocessor chip, random bit errors are more likely to occur.

In order to remedy this problem, some microprocessor systems use error-correcting codes to protect data stored in cache memories within a microprocessor chip. Although cache memory accounts for a considerable portion of the memory within a microprocessor chip, many other memory elements remain unprotected.

Some of the remaining unprotected memory elements are located within an annex (also called a result buffer or working register file) in the microprocessor system. In some processors, an annex can include hundreds of registers, which makes it likely that a random bit error will eventually occur within the annex. An annex stores temporary results of computational operations that are waiting to be committed to the architectural state of the central processing unit (CPU). For example, the annex may store the result of an addition operation before the result is ready to be written to a destination register in the CPU. When the result is ultimately written to the destination register, which is located in a register file defined by the instruction set architecture, it becomes "architecturally visible."

Note that there are many problems in using error-correcting codes to protect temporary results within an annex. The process of generating the error-correcting code, and the subsequent process of detecting an error, can take a significant amount of time. This makes it impractical to use error-correcting codes to protect temporary results, because the temporary results only exist for a short period of time. Moreover, error-correcting codes require additional circuitry, which can increase the size and complexity of a CPU.

Hence, what is needed is a method and an apparatus for fixing random bit errors that occur in temporary results without the above-described problems of using error-correcting codes.

SUMMARY

One embodiment of the present invention provides a system that corrects bit errors in temporary results within a central processing unit (CPU). During operation, the system receives a temporary result during execution of an in-flight instruction. Next, the system generates a parity bit for the temporary result, and stores the temporary result and the parity bit in a temporary register within the CPU. Before the temporary result is committed to the architectural state of the CPU, the system checks the temporary result and the parity bit to detect a bit error. If a bit error is detected, the system performs a micro-trap operation to re-execute the instruction that generated the temporary result, thereby regenerating the temporary result. Otherwise, if a bit error is not detected, the system commits the temporary result to the architectural state of the CPU.

In a variation on this embodiment, the temporary register is located within an annex that stores temporary results for in-flight instructions before the temporary results are written to a register file. For example, in a processor that supports out-of-order execution, the annex can be a result buffer that temporarily holds results produced out-of-order until they can be retired in-order.

In a further variation, the annex is organized as a first-in-first-out (FIFO) structure with pipeline stages through which the temporary result and the parity bit advance.

In a further variation, the system allows younger instructions to lookup temporary results in the annex, instead of having to wait for the temporary results to be committed to the register file. This lookup process can involve performing a content addressable memory (CAM) search for a specific destination register index. Note that because it is possible for a given destination register to appear more than once in the annex, the CAM search can possibly return more than one temporary result. In order to handle this possibility, the CAM search can be performed using a "priority CAM", which returns the matching temporary result generated by the latest instruction in the execution ordering specified by the program.

In a variation on this embodiment, committing the temporary result to the architectural state of the CPU involves writing the temporary result to an architecturally visible register within a register file.

In a variation on this embodiment, the micro-trap operation flushes the instruction pipeline of the CPU.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

CPU

Figure 1:
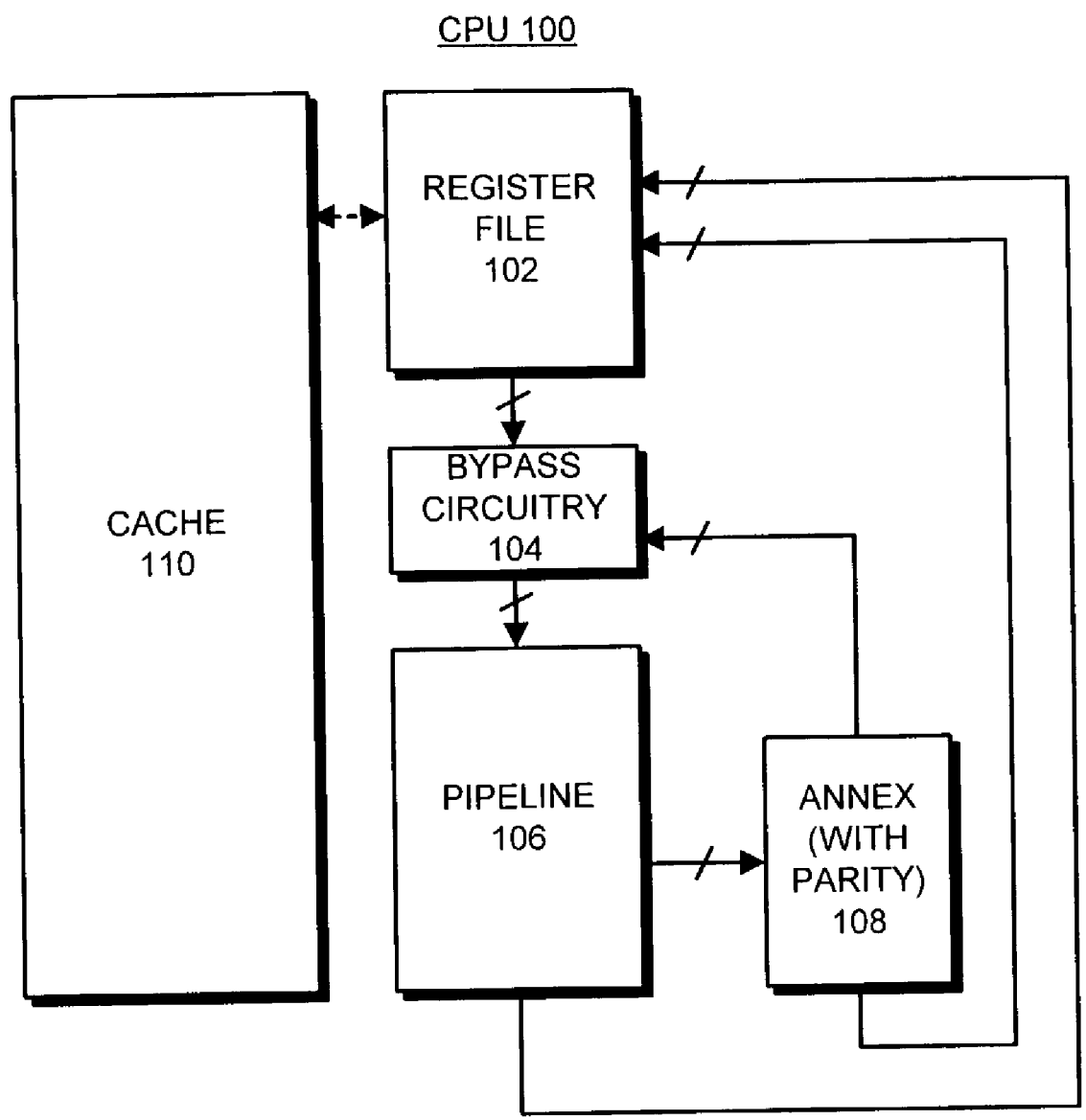
FIG. 1 illustrates a CPU in accordance with an embodiment of the present invention.

FIG. 1 illustrates the structure of a central processing unit (CPU) 100 in accordance with an embodiment of the present invention. CPU 100 can generally reside within any type of computer system, including, but not limited to, a computer system based on a microprocessor, a mainframe computer, a digital signal processor, a portable computing device, a personal organizer, a device controller, and a computational engine within an appliance.

CPU 100 includes a register file 102 for storing operands for computational operations, and results of computational operations. CPU 100 also includes a cache 110 for storing code and data. Note that cache 110 can include a separate instruction cache and data cache. Also note that cache 110 can be a level-one (L1) cache that communicates with one or more lower-level caches.

As is illustrated in FIG. 1, operands from register file 102 pass through pipeline 106, which performs computational operations on the operands to produce one or more results. These results are written back to register file 102.

Pipeline 106 feeds temporary results into an annex 108, which stores the temporary results until they are ready to be committed to register file 102.

Bypass circuitry 104 allows pipeline 106 to receive operands from either register file 102 or annex 108. This allows a temporary result to feed back directly into pipeline 106, without having to first be written into register file 102.

Note that when a value is retrieved from a specific register in register file 102, a simultaneous lookup is performed in annex 108 to determine if a temporary result in annex 108 is destined for the same register. If so, bypass circuitry 104 causes the temporary result to feed into pipeline 106 in place of the stale value retrieved from register file 102.

Also note that temporary results within annex 108 are protected by parity bits, which allow single-bit errors in the temporary results to be detected. This makes it possible to correct errors as is described in more detail below with reference to FIGS. 2–3.

Annex

Figure 2:
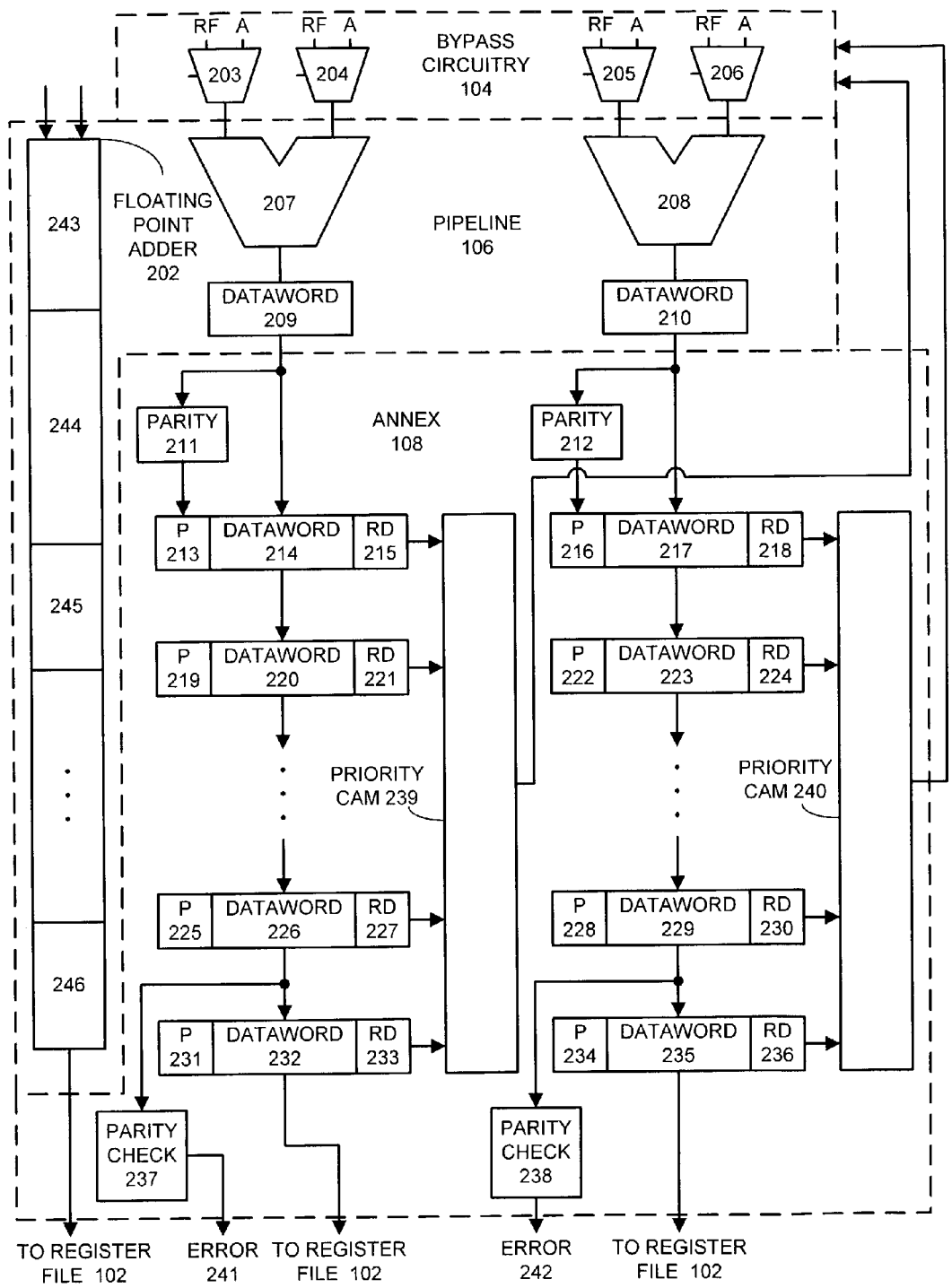
FIG. 2 illustrates an annex in accordance with an embodiment of the present invention.

FIG. 2 illustrates the structure of annex 108 in accordance with an embodiment of the present invention. As is illustrated in FIG. 2, annex 108 receives temporary results from pipeline 106.

Pipeline 106 can contain various computational circuitry. In the embodiment illustrated in FIG. 2, pipeline 106 includes a floating-point adder circuit 202, which is made up of a number of pipeline stages 143–146. Pipeline 106 also includes integer arithmetic logic unit (ALU) 207 and integer ALU 208. Note that ALU 207 and ALU 208 produce temporary results that wait in annex 108 until floating-point adder circuit 202 generates a related result. This allows the temporary results and the related result to be simultaneously committed to register file 102.

ALU 207 receives operands from multiplexers 203 and 204 within bypass circuitry 104. Multiplexers 203 and 204 allow ALU 207 to receive operands from either register file 102 or annex 108. Similarly, ALU 208 receives operands from multiplexers 203 and 204 within bypass circuitry 104, and this allows ALU 208 to receive operations from either register file 102 or annex 108. Note that in some embodiments, the inputs to floating point adder circuit 202 may also be received from annex 108.

The output of ALU 207 is latched into dataword register 209. The output of dataword register 209 passes through parity generation circuit 211 to generate a parity bit 213. This parity bit 213 moves along with its associated dataword 214 and an associated register destination index 215 through a number of pipeline stages in annex 108. Before the last pipeline stage, parity bit 225 and dataword 226 pass through parity checking circuit 237, which generates an error signal 241. Error signal 241 indicates if there is a parity error in the combination of parity bit 225 and dataword 226. If so, the system performs a micro-trap instruction to correct the error as is described in more detail below with reference to FIG. 3.

Note that register destination indices 215, 221, 227 and 233 feed into content-addressable memory (CAM) circuit 139, which performs a CAM search to determine if the index of a target register (currently being retrieved from register file 102) matches one or more of register destination indices 215, 221, 227 and 233. If there is a match, the target register contains stale data. In this case, CAM circuit 139 forwards the most current temporary value, generated by the latest instruction in the execution ordering specified by the program, to bypass circuitry 104. This allows bypass circuitry 104 to forward most current temporary value to pipeline 106 instead of the stale value retrieved from register file 102.

Note that the output of ALU 208 passes through a similar set of pipeline stages within annex 108.

Process of Protecting a Temporary Result

Figure 3:
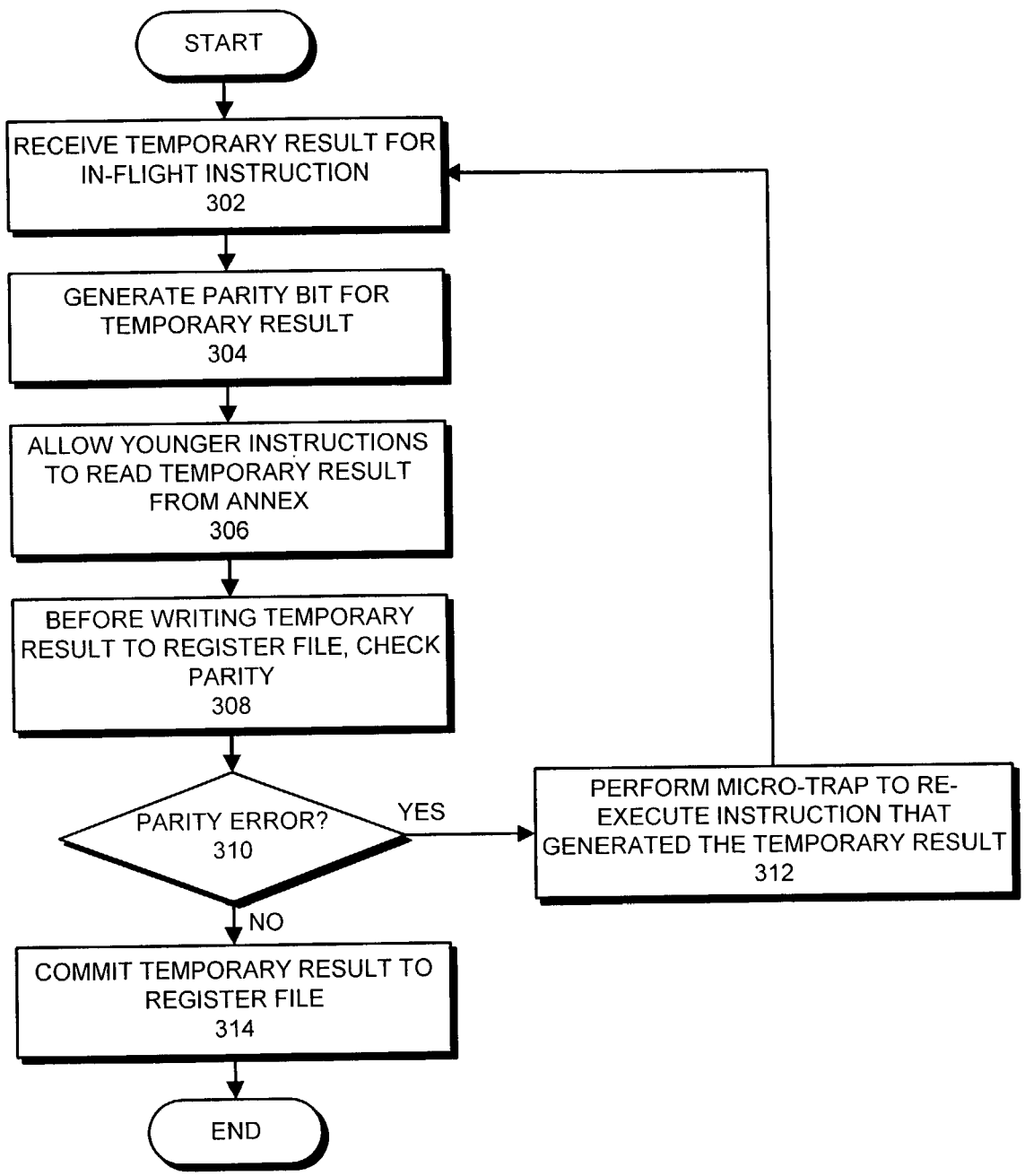
FIG. 3 is a flow chart illustrating the process of providing error correction for a temporary result in accordance with an embodiment of the present invention.

FIG. 3 is a flow chart illustrating the process of providing error correction for a temporary result in accordance with an embodiment of the present invention. During operation, ALU 207 produces a temporary result for an in-flight transaction, which is stored in dataword register 209 (step 302) (see FIG. 2). Next, the system uses parity generation circuit 211 to generate a parity bit 213 from the temporary result (step 304).

The system then passes the temporary result, the parity bit and an associated register destination index through pipeline stages within annex 108. While is transit through annex 108, a younger instructions is allowed to read the temporary result to perform a bypass operation if the younger instruction is retrieving an operand from a register that matches the associated register destination (step 306).

Near the end of the pipeline within annex 108 (before writing the temporary result to register file 102) the system uses parity checking circuit 237 to check the parity of the dataword and associated parity bit (step 308).

If a parity error is detected, the system performs a micro-trap operation, which flushes the pipeline and restarts execution from the instruction that generated the corrupted temporary result (step 312). This causes the instruction to be executed again, which regenerates the temporary result.

Note that since most faults are transient events, simply regenerating the result most often corrects the error. In order to deal with permanent faults, each time a micro-trap is generated, it is logged, so that multiple consecutive micro-traps trigger a system-level trap indicating that a permanent hardware fault exists.

Otherwise, if no parity error is detected, the system allows the temporary result to be committed to register file 102 (step 314).

The foregoing descriptions of embodiments of the present invention have been presented only for purposes of illustration and description. They are not intended to be exhaustive or to limit the present invention to the forms disclosed.

For example, the present invention can be applied to any temporary result that is generated by a CPU, and is not meant to be limited to the specific temporary results located within annex 108 illustrated in FIG. 2.

In another embodiment of the present invention, the temporary results are stored in registers that are not architecturally visible within register file 102. These non-visible registers are sometimes referred to as a "working register file" for storing temporary results, as opposed to an "architectural register file" for storing results that are architecturally visible.

Accordingly, many modifications and variations will be apparent to practitioners skilled in the art. Additionally, the above disclosure is not intended to limit the present invention. The scope of the present invention is defined by the appended claims.

What is claimed is:

1. A method for providing fault-tolerance for temporary results within a central processing unit (CPU), comprising:
receiving a temporary result for an in-flight instruction at an annex within the CPU;
generating a parity bit for the temporary result within the annex;
storing the temporary result and the parity bit in a temporary register within the annex, wherein the annex stores temporary results before they are committed to the architectural state of the processor;
before the temporary result is committed to the architectural state of the CPU, checking the temporary result and the parity bit within the annex to detect a bit error;
if a bit error is detected, performing a micro-trap operation to re-execute the instruction that generated the temporary result, thereby regenerating the temporary result;
if a bit error is not detected, committing the temporary result to the architectural state of the CPU; and
allowing younger instructions to read temporary results from the annex instead of having to wait for the temporary results to be committed to the register file;
wherein reading a specific temporary result from the annex involves performing a content addressable memory (CAM) search for a specific destination register index that is associated with the specific temporary result.

2. The method of claim 1, wherein the temporary register is located within an annex that stores temporary results for in-flight instructions before the temporary results are written to a register file.

3. The method of claim 2,
wherein the annex is organized as a first-in-first-out (FIFO) structure with pipeline stages; and
wherein the temporary result and the parity bit advance through the pipeline stages.

4. The method of claim 1, wherein committing the temporary result to the architectural state of the CPU involves writing the temporary result to an architecturally visible register within a register file.

5. The method of claim 1, wherein performing the micro-trap operation involves flushing the instruction pipeline of the CPU.

6. An apparatus that provides fault-tolerance for temporary results within a central processing unit (CPU), comprising:
the CPU;
an annex within the CPU;
a parity generation circuit within the annex that is configured to generate a parity bit for a temporary result that is associated with an in-flight instruction;
at least one temporary register within the annex for storing the temporary result and the parity bit, wherein the annex stores temporary results before they are committed to the architectural state of the processor;
a parity checking circuit within the annex that is configured to check the temporary result and the parity bit to detect a bit error before the temporary result is committed to the architectural state of the CPU; and
a micro-trap mechanism, wherein if a bit error is detected, the micro-trap mechanism is configured to perform a micro-trap operation to re-execute the instruction that generated the temporary result, thereby regenerating the temporary result;
wherein the annex is configured to allowing younger instructions to read temporary results from the annex instead of having to wait for the temporary results to be committed to the register file; and
wherein the annex is configured to support a content addressable memory (CAM) search for a temporary result associated with a specific destination register index.

7. The apparatus of claim 6, further comprising a writing mechanism, wherein if a bit error is not detected, the writing mechanism is configured to commit the temporary result to the architectural state of the CPU.

8. The apparatus of claim 7, wherein the writing mechanism is configured to write the temporary result to an architecturally visible register within a register file.

9. The apparatus of claim 6, wherein the temporary register is located within an annex that stores temporary results for in-flight instructions before the temporary results are written to a register file.

10. The apparatus of claim 9,
wherein the annex is organized as a first-in-first-out (FIFO) structure with pipeline stages; and
wherein the annex is configured so that the temporary result and the parity bit advance through the pipeline stages.

11. The apparatus of claim 7, wherein the micro-trap mechanism is configure to flush the instruction pipeline of the CPU.

12. An apparatus that provides fault-tolerance for temporary results comprising:
a CPU;
a register file within the CPU;
an annex within the CPU:
a parity generation circuit within the annex that is configured to generate a parity bit for a temporary result that is associated with an in-flight instruction;
a temporary register within the annex for storing the temporary result and the parity bit, wherein the annex stores temporary results before they are committed to the architectural state of the processor;
wherein the annex stores temporary results for in-flight instructions;
wherein the annex is configured to allowing younger instructions to read temporary results from the annex instead of having to wait for the temporary results to be committed to the register file;
a parity checking circuit within the annex that is configured to check the temporary result and the parity bit to detect a bit error before the temporary result is written to the register file; and
a micro-trap mechanism, wherein if a bit error is detected, the micro-trap mechanism is configured to perform a micro-trap operation to re-execute the instruction that generated the temporary result, thereby regenerating the temporary result;
wherein the annex is configured to support a content addressable memory (CAM) search for a temporary result associated with a specific destination register index.

13. The apparatus of claim 12,
wherein the annex is organized as a first-in-first-out (FIFO) structure with pipeline stages; and wherein the annex is configured so that the temporary result and the parity bit advance through the pipeline stages.

14. The apparatus of claim 12, wherein the micro-trap mechanism is configure to flush the instruction pipeline of the CPU.

15. A computer system that provides fault-tolerance for temporary results comprising:
- a CPU;
- an annex within the CPU:
- a main memory;
- a secondary storage device;
- a parity generation circuit within the annex that is configured to generate a parity bit for a temporary result that is associated with an in-flight instruction;
- at least one temporary register within the annex for storing the temporary result and the parity bit, wherein the annex stores temporary results before they are committed to the architectural state of the processor;
- a parity checking circuit within the annex that is configured to check the temporary result and the parity bit to detect a bit error before the temporary result is committed to the architectural state of the CPU; and
- a micro-trap mechanism, wherein if a bit error is detected, the micro-trap mechanism is configured to perform a micro-trap operation to re-execute the instruction that generated the temporary result, thereby regenerating the temporary result.

* * * * *